Figure 1:
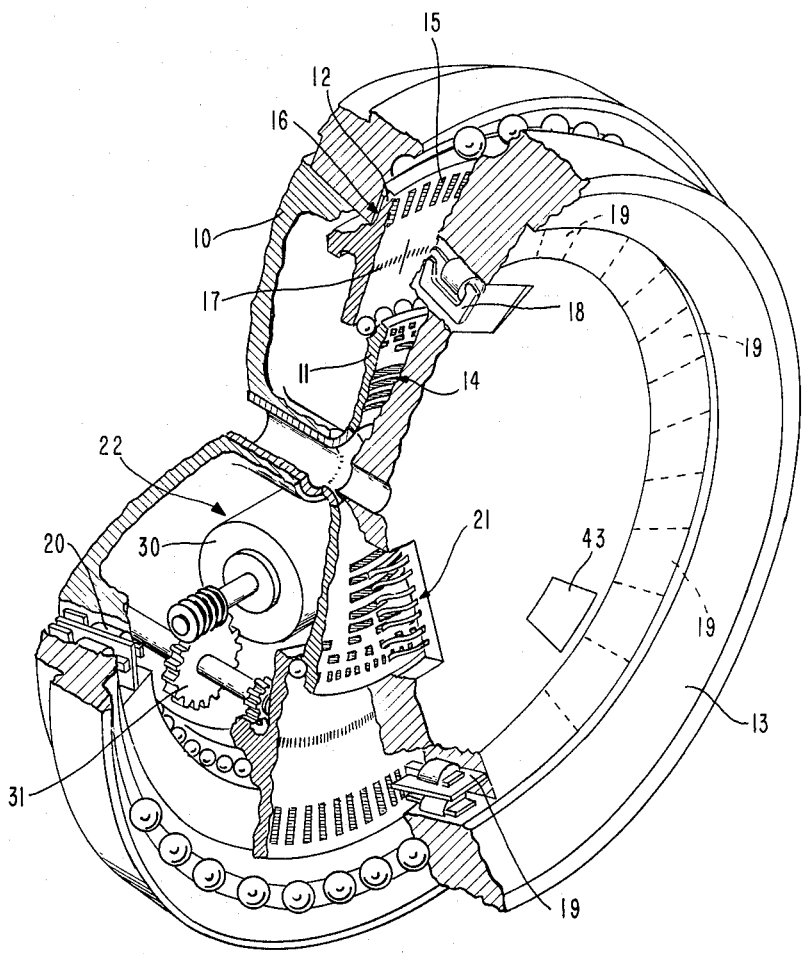

July 5, 1966     L. A. KNOX     3,259,895

ANALOG-TO-DIGITAL CONVERTER

Filed Aug. 23, 1961     3 Sheets-Sheet 1

INVENTOR
LEWIS A. KNOX

BY

ATTORNEY

July 5, 1966  L. A. KNOX  3,259,895
ANALOG-TO-DIGITAL CONVERTER
Filed Aug. 23, 1961  3 Sheets-Sheet 2
FIG. 2
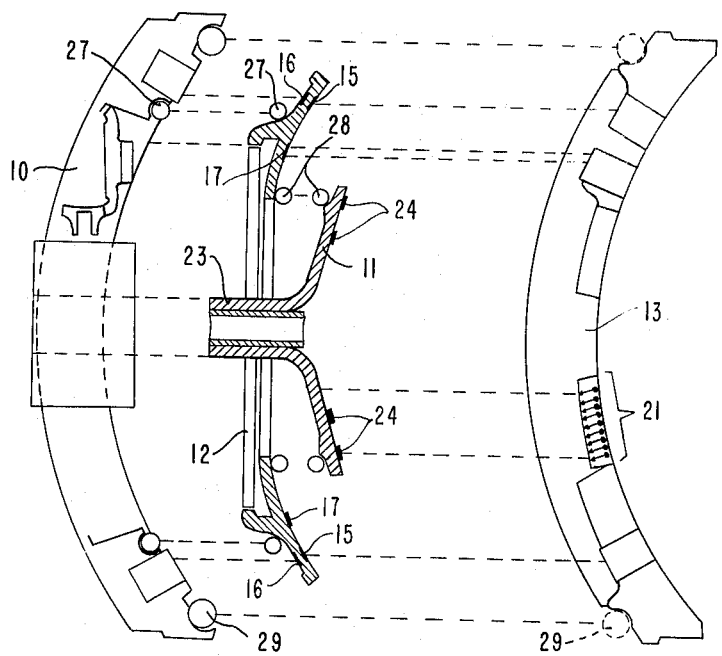
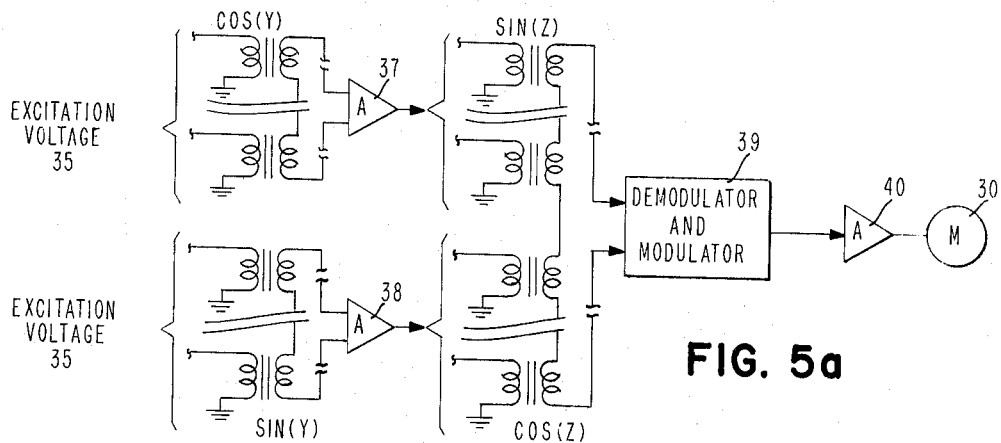
FIG. 5a
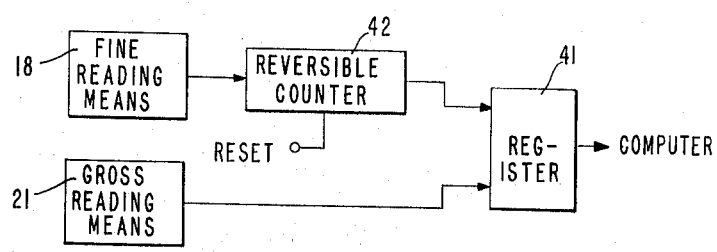
FIG. 5b July 5, 1966   L. A. KNOX   3,259,895
ANALOG-TO-DIGITAL CONVERTER
Filed Aug. 23, 1961   3 Sheets-Sheet 3
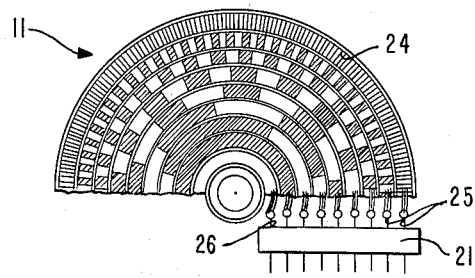
FIG. 3
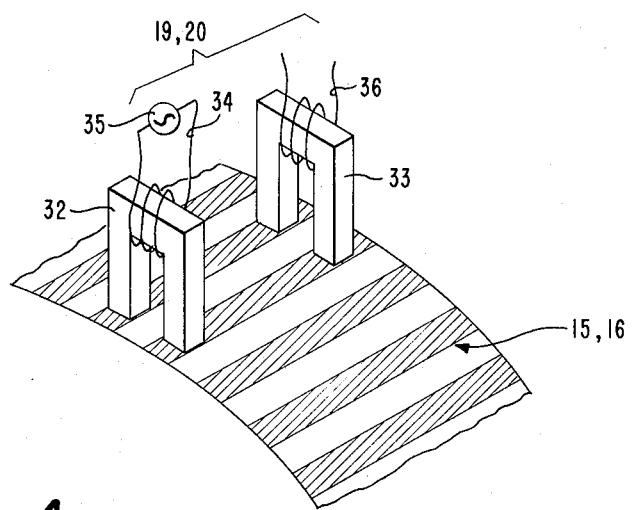
FIG. 4   (a)
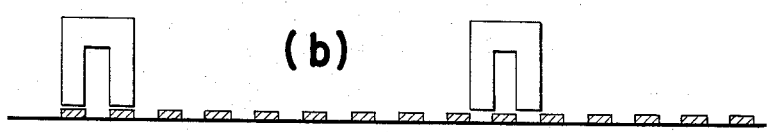
(b)

United States Patent Office 3,259,895
Patented July 5, 1966

3,259,895
ANALOG-TO-DIGITAL CONVERTER
Lewis A. Knox, Owego, N.Y., assignor to International Business Machines Corporation, New York, N.Y., a corporation of New York
Filed Aug. 23, 1961, Ser. No. 133,735
15 Claims. (Cl. 340—347)

The present invention is concerned broadly with an analog-to-digital converter, and, more particularly, with such a converter for providing digital electrical information indicative of the angular position of a shaft.

There are many situations involving measuring and computing where the initial information obtained is in the form of a change in position of a member, or specifically, rotation of a shaft through some angle. To illustrate, in inertial guidance equipment mounted within a gimbal system, an important function is the fast and precise determination of changes in position of the craft, for example, carrying the equipment. These changes in position are noted primarily as angular changes in position, or rotation, of the gimbals with respect to each other which are frequently of extremely small magnitude, e.g., several seconds of arc.

In addition to small angle determination, it is oftentimes important that the measuring device be able to keep pace with a relatively large change in shaft rotation, for example, ninety degrees, which may occur in a fraction of a second. This property is sometimes referred to by the term "slewing." Certain types of known devices incorporating direct gearing mechanisms are not capable of slewing at an adequate rate without throwing a considerable load on the mounting structure which makes them unsatisfactory for many uses, such as inertial guidance devices noted above.

Other types of small angle measuring devices optically determine the number of inscribed graduations on a disc that pass a reference point as the disc turns with the shaft. These graduations are very small requiring a ruling engine for the inscription and telescopic apparatus for reading. Although this type of equipment can achieve a high degree of accuracy, it is expensive, difficult to build and lacks stability particularly in the light sensing apparatus. In explanation of the latter, light sensing cells and diodes are critically affected by temperature extremes and nuclear radiation making their use in such environments highly problematical.

It is therefore a primary object of the invention to provide a shaft position sensing device having a resolution in the neighborhood of one second of arc.

A further object of the invention is to provide such a device which indicates the sensed position and provides an electric signal representation in digital form.

Another object of the invention is to provide such a device having high slewing capabilities.

A still further object of the invention is the provision of such a device which is relatively unaffected by temperature and nuclear radiation.

In accordance with the present invention, there is provided a first member connected to a rotatable member the angular change of which it is desired to determine, such that rotative motion is directly applied to the member. Indicia are provided on a surface of the rotatable member in a circular pattern about the axis of rotation and sensing means are disposed adjacent for providing electrical signals as the indicia moves past. A vernier member is provided with rotative power through a drive system to rotate at a set multiple rate of that of the first member. A plurality of low magnetic reluctance areas are provided on a surface of the vernier member for actuating a second sensing means disposed adjacent to provide electrical signals upon rotation of this member. A signal translating means is provided for counting and interpreting the signals from the first and second sensing means thereby achieving information indicative of the angular position of the input rotatable member.

A further aspect of the invention is the incorporation within the drive system for the vernier member of a means for limiting the drive rate below a certain maximum to permit movement of the first member at high speeds throughout large angles without producing excessively high rotation velocities of the vernier member.

The foregoing and other objects, features and advantages of the invention will be apparent from the following more particular description of a preferred embodiment of the invention, as illustrated in the accompanying drawings.

In the drawings:
FIG. 1 is a perspective partially in section view of an analog-to-digital converter made in accordance with the invention;
FIG. 2 is an exploded sectional view of the device of FIG. 1;
FIG. 3 is a perspective view of a portion of the invention showing the arrangement of positioning indicia thereon;
FIG. 4 is a schematic representation of (a) relation of magnetic read head to an information track, and (b) operative spacing of adjacent magnetic read heads; and
FIG. 5 is a schematic of the associated electrical circuits showing (a) ratio speed control, and (b) counting circuit.

Turning to FIGS. 1 and 2, the major structural elements are seen to comprise an input member 10, a gross measuring disc 11, a fine measuring disc 12 and a reference base 13. Major positioning indicia indicated generally at 14 are provided on a surface of the gross measuring disc, and first and second sets of ratio speed control indicia 15 and 16 are carried by the fine disc 12. A set of fine measuring indicia 17 is also carried by disc 12.

Reading means 18 and 19 carried by the reference base 13 are operatively related to the fine measuring indicia 17 and first set of speed control indicia 15, respectively. Similarly, other reading means 20 carried by the input member 10 are supplied for reading the set 16. In addition, a gross readout means 21 is supported by the base 13 for sensing the major positioning indicia indicated generally at 14.

A drive means 22 mounted on the input member 10 is utilized through circuits that will be set forth below to drive the fine measuring disc 12 at a predetermined relative velocity during operation to the correct indicating position.

Referring now to FIG. 2, the more detailed aspects of the different structural elements are shown. The gross measuring disc 11 is seen to consist of a substantially dish-shaped member having its central portion formed into a tubular hub 23 received within a similarly shaped opening in the member 10 in a fixed relation. On the surface of the concave portion of the disc facing away from the hub, there are arranged in a mutually spaced relation and concentric about the center point of the hub, a plurality of sets of conductive segments 24. When the sets are viewed along the axis of hub 23 as in FIG. 3, they appear as spaced concentric circles, each circle being formed of many substantially equally spaced conductive segments physically separated by insulating areas although all electrically common, and in staggered relation such that each alternate conductive segment of one circle is centered on the outer arcuate edge of a segment of the adjacent inner circle. The number of conductive segments around the outermost circle is 128 with the number of segments in succeeding sets decreasing by a factor of 2 on moving toward the center.

Still with reference to FIG. 3, the gross readout means 21 carried by the reference base 13 comprises a plurality of brush elements 25 for contacting the conductive segments 24 and providing separate circuits. When voltage is introduced at a common brush 26, the presence and/or absence of voltage at the other brush elements provides a coded indication of the position of the disc 11 with respect to the brush elements, or to any other fixed reference point. The coded condition is directly related to the gross angular position of the input shaft with the accuracy of this determination being primarily controlled by the angular width of the distance between corresponding parts of adjacent conductive segments 24 on the outermost circular path of such segments.

The fine measuring disc 12 is of annular shape with a flat surface which is beveled with respect to its general circular plane forming a dish-shaped object with the center removed. It is disposed so that the open central portion receives the tubular hub 23 of the gross measuring disc 11 therethrough. Bearing races 27 and 28, received in appropriately dimensioned wells in the member 10 and the two discs, serve to support the disc 12 concentrically with and orthogonally to the tubular hub of the gross disc 11 while permitting free rotation of the disc 12 about the hub as a geometric axis. In assembled condition, a third bearing race 29 permits free rotation of the input member 10 about the reference base 13.

The set 17 of fine measuring indicia is arranged along the inner margin of the fine measuring disc in a circular path about the hub 23 as center. The indicia consist of radially extending lineal elements of a low magnetic reluctance material such as nickel-iron, for example, disposed in an equally spaced pattern. Although for different purposes any number of such elements may be provided, here the set 17 is composed of 2,048 individual elements.

In a like manner, the set 16 consists of 256 equally spaced, radially directed lineal segments of a low magnetic reluctance material arranged in a circle concentric with the set 17 on the convex face of the margin of the disc 12.

Directly opposite the set 16 on the inner concave surface of the disc 12 is the set 15 consisting of 257 magnetic lines of the same general type as the set 16 extending completely around the margin in an equally spaced manner and also concentric with the other two sets of indicia carried by the disc 12.

Although other materials may be satisfactory for present purposes, it has been found that an improved structure and enhanced performance is obtained when the disc 12 and the sets of indicia carried by the disc are made of certain special materials. Thus, the disc was of substantially pure beryllium offering the combined valuable properties of light weight, high structural strength, high electrical conductivity and high magnetic reluctance. The value of the first two properties is self-evident, and the latter two prevent magnetic interaction during simultaneous reading of the different sets of indicia by providing a good magnetic shielding. A further and complementary advantage of beryllium, as used here, is that its thermal coefficient of expansion is sufficiently close to that of steel as to insure against the formation of "binds" or "drags" in the bearing races even at elevated temperatures and to substantially eliminate errors from unequal expansions of the disc and reading heads.

The lineal elements of the sets 15–17 were formed by electrode position of an alloy composed of approximately 50 percent Ni and 50 percent Fe providing indicia that are substantially completely corrosion resistant and at the same time possessed of low magnetic reluctance and high saturation flux density.

Drive means 22 includes a bidirectional servomotor 30 mounted on the inside, or concave face, of the input member 10 for providing rotative power through gearing 31 to the disc 12. The electrical circuits and interrelated control of this motor will be set forth in detail below.

The reading means 19 and 20 are carried by the reference base 13 and input member 10, respectively, with the operative reading portions of each facing the disc 12 and slightly spaced therefrom. As shown schematically in FIG. 4(a), each of these reading means includes a pair of U-shaped magnetic cores 32 and 33 with their gaps such that rotation of the disc 12 causes the elements of the indicia to pass successively through points where two elements magnetically link the corresponding legs of the two cores to one another (the shaded areas indicate the low reluctance indicia elements).

An excitation winding 34 is received in surrounding relationship on the core 32 and is electrically connected to a source of supply 35 of alternating voltage. A sensing winding 36 is wound on the core 33. At the different times of linkage of core 32 with core 33, i.e., registry of the core pole faces with the indicia, the flux generated in core 32 by the excitation voltage serves to induce a signal voltage in the sensing winding 36. As the indicia pass into and out of functional coincidence with the pole faces of a given reading means, a sinusoidal voltage is generated in the sensing winding 36 with the minimum value produced when an indicium is located midway between the pole faces of the respective cores.

Although FIG. 1 shows only a single reading means 19 and a single means 20, there are, in fact, sixteen (16) such means for reading each of the sets which are arranged in substantially equally spaced relation in a concentric path as shown in dashed line form in FIG. 1. In addition, as illustrated in FIG. 4(b), the reading means are disposed such that when certain of the reading means for each set of indicia are located with their pole faces in registry with certain of the indicia, other reading means of the corresponding set are simultaneously situated with the core legs in straddling relation to a magnetic element. Thus, the sixteen (16) reading means of each set are composed of eight (8) pairs of means, the output voltages of the respective members of each pair having a sine-cosine relationship. The significance of these paired voltages of contant differing phase will be set forth in the description of associated electrical circuits.

A reading means of the general type shown in FIG. 4(a) could also be adapted for use in the means 18; however, because of the relatively large number of elements composing the fine measuring indicia set 17 and consequent closer spacing of the elements, an alternate species of read head is considered more satisfactory. This read head, as before, comprises two (2) U-shaped electromagnets only here the pole faces are mutually arranged at ninety degrees to the position shown in FIG. 4(a) and the two electromagnets are spaced from one another along the path of the set of indicia such that when one of the electromagnets has both its legs simultaneously in registry with adjacent elements, its mate is disposed over a non-magnetic area between two elements (FIG. 4b). The core windings of the pair are in series and connected to a source of excitation voltage. The principle of operation is that the indicia varies the reluctance of each of the electromagnets as they move past effecting a consequent change in the current passing through the circuit containing the windings which change is read out as positioned information.

FIG. 5 illustrates a preferred form of associated circuitry for use with the aforedescribed device. These are shown in functional block and/or schematic representation only, since although the general circuit philosophy shown in the drawing has an inherent basic relation to the operation of the invention, the details of the circuits are not necessary for a proper understanding of the invention.

Essentially, the electrical circuits serve two main purposes: (1) ratio velocity control of the servomotor 30, and (2) handling the coded digital signal output of the device to render an indication of angular changes of the input member 10.

As to the circuit for effecting (1), a few comments on a convention used in the drawing (FIG. 5(a)) are in order. As noted before, the individual heads comprising the means 19 and 20 although of individually identical construction are positionally arranged to provide electric signals of two types, i.e., providing signal voltages related to one another as sine to cosine. Therefore, for ease of presentation and understanding, the drawing indicates the signal voltages coming from the windings 36 of the reading means 20 as sin (Z) and cos (Z), and those generated by the means 19 as sin (Y) and cos (Y).

With excitation voltage 35 applied to each of the cos (Y) windings 34 of the means 19, the corresponding windings 36 are seriesed for feeding a sum signal into an amplifier 37. The amplified signal is used to drive the corresponding windings 34 of the sin (Z) heads of the means 20, the secondary windings 36 of which are arranged in serial additive relation. Accordingly, the summed output of the sin (Z) heads is representative of the following mathematical relation:

$$Ex \sin (Z) \cos (Y)$$

$Ex$=excitation voltage.

Similarly, the sin (Y) signals are summed and passed through an isolation amplifier 38 to energize the excitation windings of the cos (Z) reading means obtaining a summed output signal voltage expressing the mathematical relation:

$$Ex \cos (Z) \sin (Y)$$

The composite voltages of sin (Z) and cos (Z) are then serially combined in subtractive relation to provide their difference value, namely:

$$\sin (Z-Y) = \sin (Z) \cos (Y) - \cos (Z) \sin (Y)$$

This difference voltage is then acted upon by a demodulator and modulator 39 to convert the high frequency modulated voltage (250 kc.) to a relatively low frequency signal (400 cycles per second) with the same modulation envelope. The output of the demodulator and modulator 39 is amplified by an amplifier 40 to drive the servomotor 30 in such direction as to null out the difference signal thereby stopping the servo motor and positioning the fine measuring disc 12.

A satisfactory demodulator and modulator 39 and amplifier 40 are illustrated and fully described in FIGURE 6.75 on page 6–64 and page 6–47, respectively, of Control Engineers' Handbook, John G. Truxal, editor, published by McGraw-Hill Book Company, Inc., first edition (1958).

By way of further explanation, defining the angular change of the input member 10 as A1, and the resultant corresponding angular change of the fine measuring disc 12 as A2, it is seen that the following relations obtain:

$$Y = 257(A2)$$
$$Z = 256(A1+A2)$$

Therefore:

$$(Z-Y) = (256A1 - A2)$$

It is clear that the above-described circuits provide a precise angular rotation of the fine measuring disc 12 in the ratio of 256 revolutions to each revolution of the input shaft 10.

By this sin (Z−Y) nulled to zero method described above, at least two sources of electrical errors are substantially reduced. First, even harmonic errors are canceled out, and second, the odd harmonic errors that may exist do not affect angular accuracy. This, of course, means that a relatively large degree of variation of waveform in excitation voltage can be tolerated and also manufacturing tolerances of the reading means are not prohibitively close.

The amplifier 40 has limited input reception capabilities which, if exceeded, cause the amplifier to "block," i.e., cease to provide a linear amplification of signals beyond this critical value. It is this feature which permits slewing of the device in that rapid changes of angular input to the member 10 cause the amplifier 40 to block thereby permitting the fine disc to track the gross measuring disc 11 at a rate substantially less than the 256:1 ratio obtained at lower speeds of input. Thus, when the gross measuring disc has reached the position of rest after slew, the fine measuring disc, for a short period of time, is out of null. However, since the disc 12 is out of null at this time, it will continue to move until a null is reached thereby providing the correct final measuring position for the disc despite a temporary condition of unbalance.

With respect to rendering the output signals of the reading means 18 and the gross readout means 21, reference should now be made to FIGS. 3 and 5(b). As noted before, since all the conductive segments 24 of the major positioning indicia are electrically common, voltage supplied to the common brush 26 is available to each brush element 25 whenever the brush makes contact with a conductive segment. Considering voltage presence at a brush as a "1" condition, and voltage absence at a brush as a "0" condition, knowledge of the conditions of all the brush elements for a given fixed position of the disc is a coded representation of this position. As shown in FIG. 5(b), the gross readout means is connected in a way well known in the art to a temporary storage device such as a register 41 for the temporary storage of the electrical condition of each of the brush elements 25, and thus storing a coded representation of the position of the gross measuring disc.

The parallel register described on pages 5–55 and 5–56 of the above-noted handbook is fully adequate for present purposes.

The reading means 18 during the positioning of the gross measuring disc has been providing, in serial form, signal voltages representative of the movement of the indicia 17 therepast, the count of which signifies a precise positional relationship of the fine measuring disc to the gross measuring disc. This count 42 is accumulated in a reversible counter and read out in parallel into the same register, only different positions, containing the gross count. Accordingly, the total condition of the register is a coded indication of the position of the input shaft to a very high degree of accuracy which can be interpreted by a computer to achieve the desired result. To indicate accuracy obtainable, a device of the type described here can note a change of angular position of the input shaft having a magnitude as small as 1¼ seconds of arc ($2^{20}$ bits/360 degrees).

A fully satisfactory device for use as the counter 42 is illustrated and described in the article, A Reversible Binary Counter, by R. W. Fenemore, on pages 204–206 of the May 1955 issue of Electronic Engineering.

It is necessary that reset of the reversible counter be accomplished every revolution of the fine measuring disc and at exactly the same reference point on the disc. This can be accomplished by extending one of the lineal elements of the indicia 17 inwardly (or outwardly) toward the axis of rotation of the disc 12 a short finite distance and sensing the passage of this special element as it is moved along its circular path by an appropriately located reading means 43 carried by the reference base 13. The reading means 43 can be identical in construction to the reading means 18. In effect, the generation of a zero index signal, as this is, corrects incremental readout signals from the reading means 18 after each input angular change of magnitude 360/256 degrees.

It is important to note that although certain specific forms of the reading means 18, 19 and 20 have been set forth herein, and best results are believed obtainable with the particular described means, other types of magnetic sensing heads may be fully adequate for certain purposes.

The unique construction of the device described herein affords several further error obviating enhancements. For example, disposing the reading means 19 and 20 at spaced intervals in a closed path about the axis of rotation of the disc 12 serves to provide compensating signals that substantially eliminate any errors in angle determination resulting from eccentricity of the axis of rotation of the disc 12, scale wobble, and the like.

While the invention has been particularly shown and described with reference to a preferred embodiment thereof, it will be understood by those skilled in the art that various changes in form and details may be made therein without departing from the spirit and scope of the invention.

What is claimed is:

1. A shaft position indicating device, comprising:
   (a) a first member operatively related to the shaft for rotation therewith, said member provided with a plurality of spaced indicia on at least one surface;
   (b) a second member providing at least three sets of spaced indicia, a first one of said sets having a first predetermined number of indicia, a second one of said sets having a second different predetermined number of indicia;
   (c) drive means for rotating said second member;
   (d) means responsive to said first and second sets of indicia and operatively relating the first member and the drive means for rotating said second member at a rate in excess of the rate of rotation of said first member; and
   (e) means responsive to the indicia of said first member and the indicia of the other of said sets of said second member for providing coded signals in response to passage of said indicia past at least one reference point representative of the shaft position.

2. A shaft position indicating device as in claim 1 in which said first and second members are substantially disc-shaped and mounted for axial rotation with the indicia arranged in circular paths concentric with the respective axes of rotation.

3. A shaft position indicating device as in claim 1 in which the indicia of said first and second sets carried by said second member consists of separate areas of low magnetic reluctance, and the responsive means operatively relating the first member and the driving means are magnetic voltage generators having operating faces and which are actuated on bringing said faces into opposed relation with said areas of low magnetic reluctance.

4. A shaft position indicating device as in claim 3 in which the indicia carried by said second member are of a metallic alloy having the approximate composition of 50 percent Ni and 50 percent Fe.

5. A shaft position indicating device according to claim 3 wherein the respective first and second predetermined numbers of indicia of said first and second sets consist of ($n$) and ($n+1$) indicia, respectively.

6. A shaft position indicating device as in claim 5 wherein the voltage generators provide substantially sinusoidal voltage signals and are arranged in separate groups for each of said first and second sets of indicia, the groups including pairs of said generators so arranged relative to the indicia of their respective associated sets as to provide paired signal voltages having continuous sine-cosine relationship; and the relating means includes means actuated by selected combinations of said sine and cosine signal voltages for energizing the drive means to drive the second member in such direction as to null the selected combinations of said sine and cosine voltages.

7. A shaft position indicating device as in claim 1 in which said second member is constructed of substantially pure beryllium.

8. A shaft position indicating device as in claim 1 in which the indicia of said first member include a plurality of sets of indicia arranged in closed paths around the axis of rotation with the individual indicia of the different paths in staggered relation whereby said indicia responsive means associated with the indicia of said first member provide a coded indication of the gross angular position of said input member.

9. A shaft position indicating device as in claim 1 in which said drive means is mounted on said first member.

10. A shaft angle digitizer, comprising:
    (a) an input member related to the shaft for rotation therewith;
    (b) a first disc axially secured to said input member;
    (c) a plurality of electrically conductive spaced indicia on a surface of said first disc;
    (d) means mounted adjacent said first disc for sensing said indicia as they move past during rotation and providing electrical signals in response thereto;
    (e) a second disc mounted for axial rotation;
    (f) at least three sets of indicia, each of said sets having a plurality of areas of magnetic linking material arranged on the surface of said second disc in closed paths about the axis of rotation, two of said sets having respective different predetermined numbers of said areas;
    (g) rotative drive means operatively related to said second disc;
    (h) control means responsive to the indicia of said two sets and relating said first disc and said drive means whereby rotation of said second disc is provided at a fixed rate greater than that of the speed of rotation of said first disc; and
    (i) means for sensing the passage of the areas of said second disc past a given reference point and providing separate discrete electrical signals in response thereto whereby coded digital electrical signals are obtained representative of the angular position of said shaft.

11. A shaft angle digitizer as in claim 10 in which said drive means is carried by said input member.

12. A shaft angle digitizer as in claim 10 in which said areas on said second disc are constructed of an alloy composed of approximately 50 percent Ni and 50 percent Fe.

13. A shaft angle digitizer as in claim 10 in which said second disc is constructed of substantially pure beryllium.

14. A shaft angle digitizer as in claim 10 in which there is further provided means for generating a discrete electrical signal for each revolution of said second disc.

15. A shaft angle digitizer as in claim 10 in which said control means includes speed restricting means for preventing the drive means from exceeding a predetermined upper limit of rotative speed.

References Cited by the Examiner

UNITED STATES PATENTS

| | | | |
|---|---|---|---|
| 2,850,240 | 9/1958 | Dickinson | 340—347 |
| 2,938,198 | 5/1960 | Berman et al. | 340—347 |
| 2,942,252 | 6/1960 | Wolff | 340—347 |
| 3,046,541 | 7/1962 | Knox | 340—347 |
| 3,132,336 | 5/1964 | Zola | 340—347 |

MALCOLM A. MORRISON, *Primary Examiner.*